O. BÜHRING.
APPARATUS FOR THE SEPARATION OF CONDENSED WATER FROM LUBRICATING OIL.
APPLICATION FILED MAR. 18, 1911.
1,045,811. Patented Dec. 3, 1912.
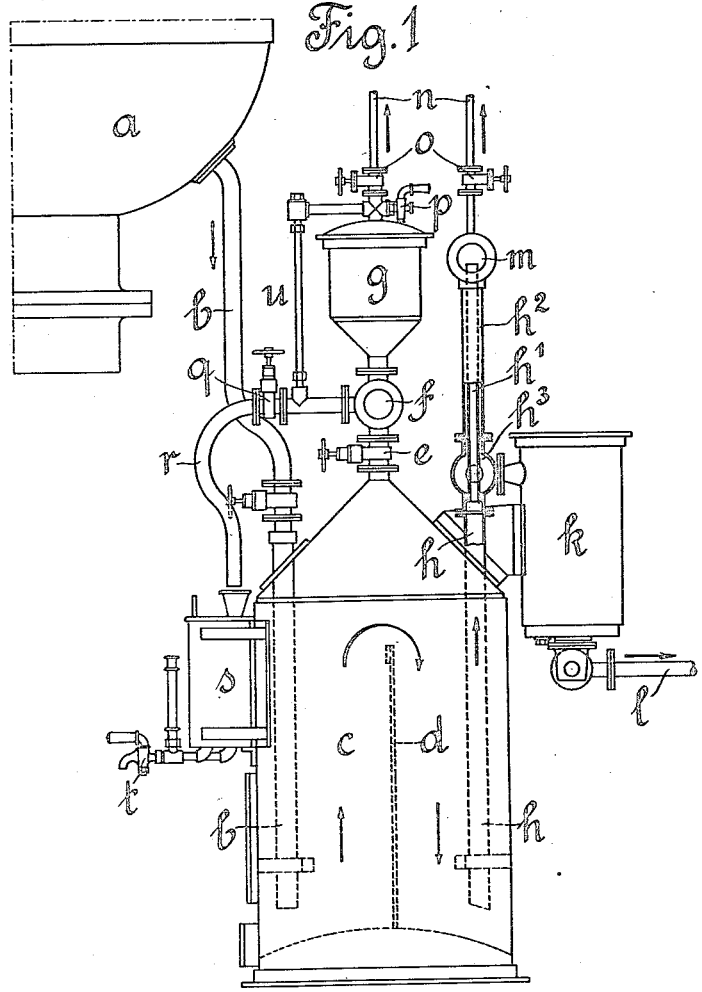
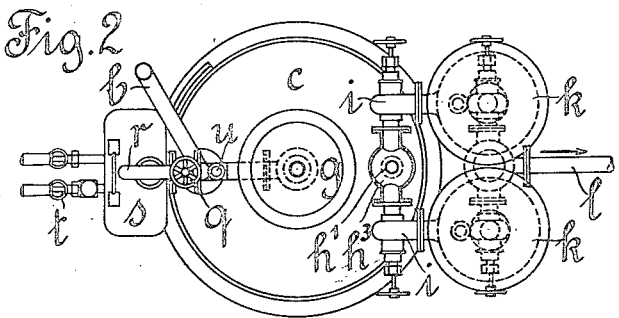
Witnesses:
Inventor
Otto Bühring
By B. Singer
Attorney.

UNITED STATES PATENT OFFICE.

OTTO BÜHRING, OF MANNHEIM, GERMANY.

APPARATUS FOR THE SEPARATION OF CONDENSED WATER FROM LUBRICATING-OIL.

1,045,811. Specification of Letters Patent. Patented Dec. 3, 1912.

Application filed March 18, 1911. Serial No. 615,363.

*To all whom it may concern:*

Be it known that I, OTTO BÜHRING, engineer, a subject of the German Emperor, residing at Mannheim, in the Grand Duchy of Baden and Empire of Germany, have invented certain new and useful Improvements in Apparatus for the Separation of Condensed Water from Lubricating-Oil, of which the following is a specification.
This invention relates to apparatus for the clarification of the oily water coming from an exhaust steam oil separator, that is for the separation of the condensed water from the lubricating oil separated from the exhaust steam, and which is more particularly applicable for use on steam ships. Older apparatus of this kind have the disadvantage that on the rocking of the ship the oily water in the clarifying receptacle is continually vigorously shaken so that complete separation of oil and water is impossible. To obviate this disadvantage it has been proposed to employ a closed receptacle for clarifying the oily water, which continually remains completely filled with the liquid. In this case on the rocking of the ship there takes place also, it is true, a slight vibration of the surface of the water in the clarifying receptacle; a mixing together of water and oil is however obviated as the necessary free space for the agitating movement is not contained in the receptacle.

My improved apparatus, in which there is also provided a closed clarifying receptacle, is adapted for use in cases where the oil separator operates under a vacuum, for example, for plants with condensing engines. According to my invention the clarifying receptacle is provided in the conduit from the oil separator to the condenser and is also maintained under a vacuum. By these the force pump which is otherwise necessary for the supply of the oily water, and which must continually operate against the high vacuum of the condenser and consequently easily refuses to operate, is unnecessary, and thus there is also obviated the disadvantage of such pump that it mixes the water and oil into what may be termed an emulsion, whereby the clarification is affected. If there is not a sufficient head, then instead of the said pump only a small ordinary pump (for example a rotary pump) is necessary which does not possess the hereinbefore mentioned disadvantages.

In the accompanying drawing is illustrated a constructional form of the invention.

Figure 1 is a side elevation and Fig. 2 is a plan of the apparatus.

The oily water passes from the collecting chamber of the oil separator $a$ by the pipe $b$ into the lower part of the clarifying receptacle $c$ and within this rises along one side of the partition $d$. While the water passes over this partition and down the other side thereof the lighter oil, which separates itself from the water and rises on both sides of the partition $d$ in the form of small balls, collects in the conical upper part of the receptacle $c$, from which it rises through the valve $e$ and the inspection glass $f$ into the vessel $g$. The clarified water (from which the oil has been separated) rises in the tube $h$ and in the narrower tube $h^1$ connected thereto, passes over the upper end of the latter, flows down the tube $h^2$ surrounding the tube $h^1$, distributes in the branch piece $h^3$ toward both sides, passes through the valves $i$ and the filters $k$ and finally enters the condenser through the conduit $l$. As the receptacle $c$ is closed and is lower than the oil separator $a$ and as the overflow tube $h^1$ terminates above the receptacle $c$, the latter continually remains completely filled with water and oil, which offers the advantage referred to in the preamble.

The oil separator operates under a vacuum and in order to maintain also the receptacle $c$ and the vessel $g$ under a vacuum, the latter as also the inspection glass $m$ provided at the upper ends of the tubes $h^1$ and $h^2$ are connected to small tubes $n$ which lead into the vacuum conduit leading to the oil separator.

The valve $e$ is advantageously kept open so that the oily water immediately rises in the vessel $g$ to the height of the overflow in the inspection glass $m$, but is gradually moved downward by the separated oil. When the water has descended to below the inspection glass $f$, that is when water free of oil can be seen behind this, the valves $e$ and $o$ are closed and the air cock $p$ is opened so that air enters the vessel $g$. The valve $q$ is then also opened, whereupon the oil flows from the vessel $g$ through the tube $r$ into the filter $s$; the oil purified by the latter is drawn off through the cock $t$. By means of the glass tube $u$ the height of the oil in the vessel $g$ can be observed.

What I claim and desire to secure by Letters Patent is:—

1. In an apparatus for the separation of condensed water from lubricating oil, a closed clarifying receptacle provided with a conical cover, a feed pipe leading from the oil and water collecting chamber of an exhaust steam oil separator arranged above the said receptacle to the lower part of the latter, an overflow tube leading from the lowest part of said receptacle and terminating above the said cover, an oil collecting vessel arranged above and connected to said receptacle and having a tapping tube and an aeration cock, a valve for shutting off said vessel from said receptacle, tubes connecting the upper end of said overflow tube and the top of said vessel to a vacuum conduit, and valves for shutting off said overflow tube and said vessel from said conduit.

2. In an apparatus for the separation of condensed water from lubricating oil, a closed clarifying receptacle provided with a conical cover, a feed pipe leading from the oil and water collecting chamber of an exhaust steam oil separator arranged above said receptacle to the lower part of the latter, an overflow tube leading from the lower part of said receptacle and terminating above the said cover, a vertical partition arranged in said receptacle between said feed pipe and said overflow tube, an oil collecting vessel arranged above and connected to said receptacle and having a tapping tube and an aeration cock, a valve for shutting off said vessel from said receptacle, tubes connecting the upper end of said overflow tube and the top of said vessel to a vacuum conduit, and valves for shutting off said overflow tube and said vessel from said conduit.

3. In an apparatus for the separation of condensed water from lubricating oil, a closed clarifying receptacle provided with a conical cover, a feed pipe leading from the oil and water collecting chamber of an exhaust steam oil separator arranged above said receptacle to the lower part of the latter, an overflow tube leading from the lower part of said receptacle and terminating above the said cover, a further tube surrounding the upper part of said overflow tube and connecting the upper end of the latter to a conduit leading to a condenser, an inspection glass mounted on the upper end of said further tube and surrounding the upper end of said overflow tube, an oil collecting vessel arranged above and connected to said receptacle and having a tapping tube and an aeration cock, a valve for shutting off said vessel from said receptacle, tubes connecting said inspection glass and the top of said vessel to a vacuum conduit, and valves for shutting off said inspection glass and said vessel from said vacuum conduit.

4. In an apparatus for the separation of condensed water from lubricating oil, a closed clarifying receptacle provided with a conical cover, a feed pipe leading from the oil and water collecting chamber of an exhaust steam oil separator arranged above the said receptacle to the lower part of the latter, an overflow tube leading from the lower part of said receptacle and terminating above the said cover, a vertical partition arranged in said receptacle between said feed pipe and said overflow tube, a further tube surrounding the upper part of said overflow tube and connecting the upper end of the latter to a conduit leading to a condenser, an inspection glass mounted on the upper end of said further tube and surrounding the upper end of said overflow tube, an oil collecting vessel arranged above and connected to said receptacle and having a tapping tube and an aeration cock, a valve for shutting off said vessel from said receptacle, tubes connecting said inspection glass and the top of said vessel to a vacuum conduit, and valves for shutting off said inspection glass and said vessel from said vacuum conduit.

In testimony whereof I have affixed my signature in presence of two witnesses.

OTTO BÜHRING.

Witnesses:
August O. Rinmus,
A. O. Tillmann.